June 6, 1939.  R. ERICH  2,161,411
INERTIA SWITCH
Original Filed Jan. 19, 1937
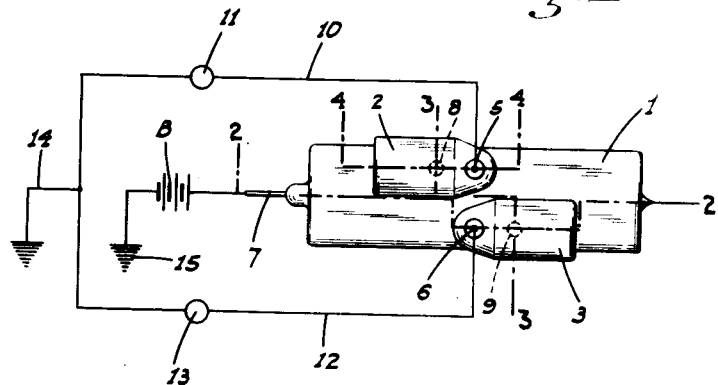
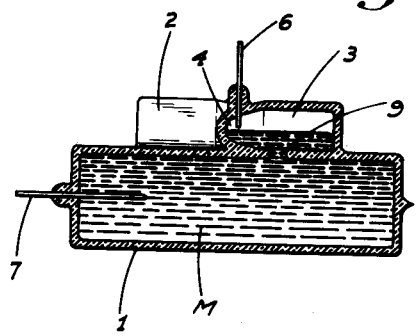
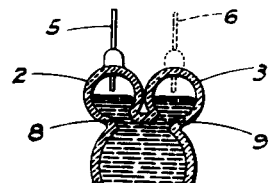
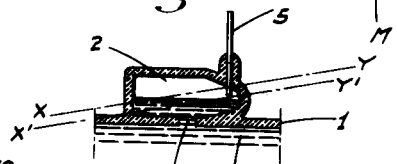
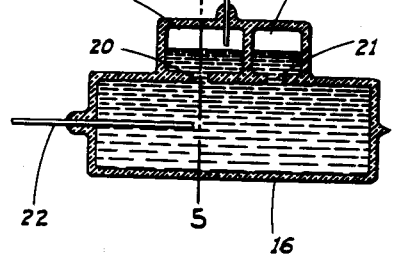
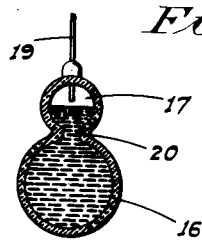
INVENTOR
R. Erich
BY
ATTORNEY Patented June 6, 1939

2,161,411

UNITED STATES PATENT OFFICE 2,161,411

INERTIA SWITCH

Reuben Erich, Avenal, Calif.

Application January 19, 1937, Serial No. 121,297
Renewed November 21, 1938

10 Claims. (Cl. 200—52)

This invention relates generally to an inertia or impulse switch, and in particular relates to an inertia switch primarily designed for use on motor vehicles for the purpose of automatically actuating electric warning signals thereon.

The principle object of my present invention is to provide an inertia switch for vehicle signalling which will be effectively and automatically actuated by velocity changes of the vehicle, whether the inertia impulses from such velocity changes be slight and of relatively short duration or of relatively great magnitude and prolonged.

An additional object of this invention is to provide an inertia switch of the type described which will operate to give a momentary or relatively short signal when the inertia impulses from velocity changes are slight as those induced by normal deceleration on engine compression but without the use of brakes, and to give a continued signal when the inertia impulses are of relatively great magnitude, as those induced by deceleration caused by braking the vehicle.

Another object of this invention is to provide an inertia switch which is so designed that, while being extremely responsive to inertia changes, the force of gravity does not effect its normal operation nor actuate the switch when the vehicle ascends or descends grades. Too, the switch is so constructed that road shocks are absorbed and do not interfere with the desired operation of the switch.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a top plan view of the preferred form of the switch; the circuit for the switch being shown diagrammatically.

Figure 2 is a sectional elevation on line 2—2 of Fig. 1.

Figure 3 is a cross section taken on line 3—3 of Fig. 1.

Figure 4 is a fragmentary section on line 4—4 of Fig. 1.

Figure 5 is a sectional elevation of a modified form of the invention.

Figure 6 is a cross section taken on line 5—5 of Fig. 5.

Referring now more particularly to the characters of reference on the drawing, and particularly at present to the inertia switch shown in Figs. 1-4 inclusive, the numeral 1 indicates a relatively long container, preferably circular in cross section as shown.

Two laterally offset chambers, indicated as 2 and 3, are formed on top of the container 1; the chambers being disposed in lapped relation and with their longitudinal axes parallel. The adjacent ends of each chamber are somewhat reduced in diameter or tapered, as at 4, for the purpose hereinafter described.

Electrodes, indicated at 5 and 6 are mounted in connection with the device and project vertically into the chambers 2 and 3 respectively to a termination above the bottom thereof. These electrodes are disposed close to the adjacent ends of the chambers and are in a transverse plane which lies equidistant between the end planes of the container 1 or, in other words, centrally of the longitudinal axis of such container. Another electrode 7 projects into container 1 at one end.

The container 1 is filled with a conducting liquid, such as mercury M. Bleed holes 8 and 9 extend from chambers 2 and 3 respectively into the container 1 and afford communication therewith. The chambers 2 and 3 also contain a quantity of mercury, the normal level of which lies in a plane a short distance below the lower end of electrodes 5 and 6.

In use on a motor vehicle the above described inertia switch is mounted on the vehicle with the container 1 in a normally horizontal position, and with its longitudinal axis disposed longitudinally of the vehicle, the end bearing electrode 7 being the front end.

The terminal 5 is connected by a lead 10 to a signal globe 11 while terminal 6 is connected by lead 12 to signal globe 13. Lead 14 grounds the other side of both globes. Terminal 7 is connected to one side of a battery B which is grounded at 15 on the other side.

Operation

The switch when so constructed and mounted functions in the following manner:

When the vehicle is traveling on a level road at a constant speed, the surface of the mercury M does not contact either electrode 5 or 6 and the signal lights are not in operation. Also, as the electrodes are disposed in a transverse plane, which is equidistant from the ends of container 1, the electrodes will not be engaged by the mercury as the vehicle ascends or descends grades— the surface of the mercury at a point immediately below the electrodes remaining a constant distance therefrom. Thus, the effect of gravity is overcome and cannot act on the mercury so as to actuate the signals. Too, by reason of the tapered portion of the chambers, the effect of road shock is overcome and it cannot act to upset the operation of the switch as hereinafter described.

Whenever the vehicle decelerates on engine compression only, there is only a slight inertia impulse on the body of mercury M in container 1 and chambers 2 and 3. However, such slight inertia impulse will cause the surface of the mercury in chamber 2 to assume an inclined plane as shown at x—y in Fig. 4, and the mercury to contact electrode 5 and close a circuit through globe 11, which will preferably be red and suitably mounted on the vehicle.

Under the above condition, i. e. a slight inertia impulse, due to vehicle deceleration, I desire the signal to be given only momentarily and accomplish this result as follows:

At the instant the inertia impulse, due to deceleration, occurs, the mercury in both chambers 2 and 3 assumes an inclined plane due to the fact that a liquid acted upon by a constant acelerating or decelerating force due to inertia assumes such an inclined plane. At the time the liquid in both chambers assumes such inclined planes, there will also be a slight displacement or decrease of mercury in chamber 3 and a corresponding increase of mercury in chamber 2 for the reason that the chambers are in effect intercommunicating (by reason of bleed holes 8 and 9 into container 1) and chamber 2 is disposed ahead of chamber 3. The assumption of the mercury in chamber 2 of an inclined plane, plus the slight volumetric increase of mercury in said chamber, brings the mercury to line x—y actuating the signal. However, as liquids in intercommunicating chambers seek a common level under constant conditions, the moment the deceleration becomes constant the level of the mercury in the chambers is equalized and falls to the level X'—Y' in chamber 2. Thus, as the lower end of electrode 5 is disposed at a point above such equalized level x'—y' but below the level X—Y, the circuit 1 through globe 11 will be closed only momentarily upon the occurrence of slight inertia impulses, such as those caused by deceleration on engine compression.

Slight inertia impulses caused by acceleration of the vehicle will likewise actuate the switch, however, the contact will take place in chamber 3 and globe 13 will be illuminated. The globe 13 will preferably be associated with an amber signal in order that a deceleration signal (red) may be distinguished from an acceleration signal (amber).

By regulating the size of bleed openings 8 and 9, the length of time required for the mercury in the chambers to assume an equalized level will be regulated, thus varying the signal period.

When the vehicle decelerates due to an application of the brakes, the switch operates to give a continuous signal during the braking operation. This result is accomplished when an inertia impulse of relatively great magnitude occurs and is prolonged. This is due to the fact that there will then be an actual displacement of a portion of the mercury from the forward end of container 1 resulting in the mercury level in both chambers 2 and 3 being raised to such an extent that, during the braking operation, both electrodes 5 and 6 will be engaged by the mercury and globes 11 and 13 illuminated giving a dual and continuous signal. In such instance the mercury level in the chambers is raised to such an extent that even when the level equalizes in the chambers, both electrodes 5 and 6 will remain in contact with the mercury. To effectively produce this result, the container 1 must be of sufficient length and diameter to hold such a quantity of mercury as to not only permit of the desired displacement but to maintain the requisite head of mercury in both chambers.

The modified form of the device shown in Figs. 5 and 6 functions in the same manner as described relative to the preferred form of the invention with the exception that it will only operate to control an acceleration or deceleration signal but not both.

The numeral 16 illustrates a container, similar to container 1, formed with two longitudinal alined chambers 17 and 18, the chamber 17 being of a greater length than chamber 18. An electrode 19 projects into chamber 17 adjacent its inner end and is disposed equidistant from the plane of the ends of container 16. Bleed holes 20 and 21 extend from chambers 17 and 18 into container 16. Another electrode 22 projects into one end of the container 16. This modified switch is connected in a circuit similar to that shown in Fig. 1 but globe 13 and its leads are omitted.

In function and operation this modified form of inertia switch corresponds to the preferred form. With slight inertia impulses, a momentary signal will be given while with impulses of greater magnitude, a prolonged or continuous signal will be given.

If desired, the container 1 and chambers 2 and 3 may be metallic, in which event electrodes 5 and 6 would be insulated from the chambers at the point of engagement therewith and the case itself would be grounded and the battery disposed elsewhere in the circuit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an inertia switch, a relatively long container adapted for mounting longitudinally of a vehicle, two chambers formed on top of the container, the main portion of one chamber being disposed ahead of the other chamber, the container having a bleed opening in communication with each chamber, a body of conducting fluid filling the container and partially filling the chambers, an electrode contacting the liquid, and another electrode extending into said one chamber adjacent its rear end and terminating short of the normal surface of the liquid a predetermined distance.

2. A device as in claim 1 in which said last named electrode is disposed in a plane equidistant from the end planes of the container.

3. A device as in claim 1 in which the chambers are longitudinally alined and said one chamber is of greater length than the other, the inner end of said last named electrode being disposed in a plane equidistant from the end planes of the container.

4. In an inertia switch for vehicles, a chamber, another horizontal chamber disposed adjacent one end of said first named chamber in the same horizontal plane, means forming a passage between said chambers, a body of conducting liquid partially filling said chambers, said passage permitting flow of the liquid from one chamber to the other, an electrode normally contacting the liquid, and another electrode extending into said first named chamber adjacent said one end thereof and terminating short of the normal surface level of the liquid a predetermined distance.

5. A device as in claim 4 in which the inner end of the last named electrode is disposed in a plane equidistant from the end planes of the body of liquid and terminates at a point below the level which the liquid in the first named chamber will assume when the device is subjected to the initial inertia impulse created by deceleration of the vehicle but above the level which the liquid in said chamber will assume when the deceleration becomes constant.

6. In an inertia switch, a relatively long container adapted to be mounted longitudinally of a vehicle, two chambers formed on top of the container, said chambers being laterally offset and lapped at adjacent ends, the container having a bleed opening in communication with each chamber, a body of conducting fluid filling the container and partially filling the chambers, an electrode contacting the liquid, and other electrodes extending into the chambers close to the adjacent ends thereof and terminating a predetermined distance above the normal surface of the liquid.

7. A device as in claim 6 in which the chambers are tapered at adjacent ends.

8. A device as in claim 6 in which the inner ends of said other electrodes lie in a plane transversely of the container equidistant from both ends thereof.

9. An inertia switch comprising a pair of chambers whose adjacent end portions lie in a common horizontal plane, a body of conducting liquid in said chambers to a normal level below the top of the end portions thereof, means forming a restricted liquid passage between the chambers below the normal level of the liquid, an electrode normally contacting the liquid and another electrode projecting into the end portion of one chamber and terminating a predetermined distance above the normal surface level of the liquid.

10. A structure as in claim 9, in which said chambers are horizontal and project in opposite directions from said end portions.

REUBEN ERICH.